United States Patent [19]

Henderson

[11] Patent Number: 5,764,511
[45] Date of Patent: Jun. 9, 1998

[54] SYSTEM AND METHOD FOR CONTROLLING SLOPE OF CUT OF WORK IMPLEMENT

[75] Inventor: Daniel E. Henderson, Washington, Ill.

[73] Assignee: Caterpillar Inc., Peoria, Ill.

[21] Appl. No.: 492,644

[22] Filed: Jun. 20, 1995

[51] Int. Cl.$^6$ .................. G06F 19/00; E02F 3/84
[52] U.S. Cl. .................. 364/167.01; 364/424.07; 356/3.12; 172/4.5
[58] Field of Search .................. 364/167.01, 424.07, 364/443, 449, 474.28, 474.34, 474.35; 172/4.5; 404/84.2, 84.5; 356/3, 12

[56] References Cited

U.S. PATENT DOCUMENTS

| | | | |
|---|---|---|---|
| 4,805,086 | 2/1989 | Nielsen et al. | 364/167.01 |
| 4,807,131 | 2/1989 | Clegg | 364/424.01 |
| 4,820,041 | 4/1989 | Davidson et al. | 356/1 |
| 4,912,643 | 3/1990 | Beirxe | 364/449 |
| 5,100,229 | 3/1992 | Lundberg et al. | 356/1 |
| 5,144,317 | 9/1992 | Duddek et al. | 342/357 |
| 5,359,521 | 10/1994 | Kyrtsos et al. | 374/449 |
| 5,375,059 | 12/1994 | Kyrtsos et al. | 364/449 |
| 5,404,661 | 4/1995 | Sahm et al. | 37/348 |
| 5,438,771 | 8/1995 | Sahm et al. | 37/348 |
| 5,442,868 | 8/1995 | Ahn | 37/348 |
| 5,519,620 | 5/1996 | Talbot et al. | 364/449 |

FOREIGN PATENT DOCUMENTS

3610666 10/1987 Germany.
59-154235 3/1984 Japan.

*Primary Examiner*—Reba I. Elmore
*Assistant Examiner*—Steven R. Garland
*Attorney, Agent, or Firm*—Alan J. Hickman

[57] ABSTRACT

A system and method for automatically controlling the position of a work implement movably connected to a work machine and maintaining the work implement at a preselected slope of cut relative to a geographic surface is provided. The system has first and second receiving devices mounted on the work implement for receiving position signals from a plurality of remote locations. A processor determines the actual slope of cut of the work implement based on the received position signals. An implement controller delivers an implement control signal in response to a difference between the actual and a preselected desired slope of cut of the work implement. An implement control system elevationally changes the slope of cut of the work implement at an automatic mode of operation of the system. The system is particularly suited for use on a geographic surface altering work machine.

15 Claims, 5 Drawing Sheets

SYSTEM AND METHOD FOR CONTROLLING SLOPE OF CUT OF WORK IMPLEMENT

TECHNICAL FIELD

This invention relates to a method and system for controlling the slope of cut of a work implement and more particularly to a method and system for automatically controlling the position of a work implement to maintain a preselected slope of cut of a geographic surface.

BACKGROUND ART

Machines, for example, motor graders, dozers, compactors, pavers, and profilers to name a just a few, are used for geographic surface altering operations. Such machines typically operate at construction sites which were previously manually surveyed, and staked according to construction site plans. During the process the construction site is frequently checked in order to confirm that the processed site meets the design specifications. This process requires large amounts of manual labor much of which is by highly trained personnel. Further, the machine operator must be highly trained in order to obtain the degree of accuracy required.

Laser systems have been in use in some applications to provide a reference for the operator to follow. A laser beam emitted by a laser positioned at a surveyed location on the site is swept over the site. This establishes a laser plane. A receiver on the machine receives the laser beam and indicates to the operator the elevational position of the beam relative to a location on the machine, such as the machine or implement. This information is used by the machine operator for machine controlling purposes. An example of one such system is shown in U.S. Pat. No. 4,807,131 dated Feb. 21, 1989, to Philip M. Clegg. This patent discloses measuring the elevational position of the grading blade relative to the laser plane and displaying on a monitor parameters such as target elevation, actual elevation, and an allowable range of error so that the operator can, in one mode of operation, adjust the blade position to be within tolerance of the target location.

Implements are normally adjustably connected to the machine frame so that the slope, pitch, and elevation of the work implement can be varied relative to the machine. When the laser receiver is mounted on the machine frame any change in the position of the work implement relative to the frame causes an unaccounted for change in the position of the work implement relative to the laser plane and the receiver. The information therefore provided to the operator is less than desirable and may not be used to any significant advantage. Placing a single laser receiver on the work implement eliminates this problem to the extent that the laser receiver moves with the work implement and is related to work implement position. However, any changes in tilt, pitch or rotation of the work implement relative to the laser plane are not compensated for and therefore the information provided is still not accurate. Providing a pair of laser receivers on the implement would improve position determining capabilities but would not enable the slope of cut of the work implement to be accurately determined.

Systems are known which use a constellation of satellites and a special receiver to determine by triangulation the position of a machine (actually the position of the receiver) in three space coordinates relative to a work site coordinate system. Such systems are normally referred to as a kinematic global positioning systems (GPS). Historically, such systems have not been widely accepted since the accuracy of position determination was less than satisfactory for certain applications. Further, slow processing time reduced the commercial feasibility of determining machine position in realtime. Over the past few years the accuracy of position determination has been improved and the speed of processing has been increased. Thus, the potential to determine the realtime position of a machine is now feasible for an assortment of applications including, for example, geographic surface altering machines.

It is desirable to utilize a global positioning system to determine the realtime position of the work implement, for example, the cutting edge of a geographic surface altering implement. By placing a GPS receiver on the work implement it would appear that the location of the cutting edge could be measured. However, after a closer look, the inability to deal with the dynamics of the work implement and accurately accommodate variations in work implement orientation relative to the frame makes such a modification unlikely.

Any GPS receiver mounted on a work implement must be spaced from the cutting edge because of the harsh environment in which the implement operates. Since the GPS receiver determines the position of the antenna of the receiver in space and not the position of the cutting edge, any variations in the orientation of the work implement, such as discussed above, reduces the possibility of being able to accurately determine the cutting edge position. For at least the above reasons placement of a GPS receiver on the work implement would not be considered.

In some applications the accuracy of determining the coordinate position of a work implement relative to a work site using a GPS receiver is less than required to meet acceptable standards. The measured accuracy in the elevational direction of the site coordinate system is particularly important in applications where the end product is a finished surface, for example, a road way surface. Attempts to address this problem are being made but have not resulted in a GPS system with sufficient accuracy.

It is desirable to provide a control system that enables the work implement to be placed at a selected position at which a desired slope of cut is obtained. However, due to the dynamics of machine operation, the slope of cut changes as the machine moves. Further, blade movement such as rotation, pitch and tilt and the like affect the slope of cut of the work implement. Today, the machine operator must continuously adjust the work implement position to maintain the desired slope of cut. To do so requires a substantial amount of skill. Even the best machine operators have difficulty in accurately maintaining the slope of cut at the desired angle. To date there has been no successful solutions to this problem.

The present invention is directed to overcoming one or more of the problems as set forth above.

DISCLOSURE OF THE INVENTION

In one aspect of the present invention, a system for controlling the position of a work implement movably connected to a work machine and maintaining the work implement at a preselected slope of cut relative to a geographic surface is provided. A first receiving device, connected to the work implement and at a first preselected location relative to a first point location on the work implement, receives electromagnetic radiation delivered from a plurality of remote locations and responsively produces a first position signal. A second receiving device, connected to the work implement and at a second preselected location relative to a second point location on the work implement spaced a preselected distance from the first location, receives electromagnetic radiation delivered from the plurality of remote locations and responsively produces a second position signal. A slope selector selects a desired cross slope of cut of the implement and delivers a responsive desired slope signal. A processor receives the first and second position signals, determines the first and second point positions of the implement in a site coordinate system, determines the actual cross slope of cut of the work implement based on the first and second point positions and previous first and second point positions and delivers a responsive actual slope signal. A control receives the desired and actual slope signals, compares the actual cross slope of cut of the work implement to the desired cross slope of cut of the work implement, and elevationally moves the work implement to change the relative elevational positions of the first and second point locations on the implement in response to a difference between the desired and actual cross slope of cut of the work implement. The implement moves in an elevational direction based on a difference of comparison between the desired and actual cross slope of cut of the work implement.

In another aspect of the present invention, a method for automatically controlling the slope of cut of a work implement is provided. The method includes the steps of determining the actual slope of cut of the work implement; determining a difference between the actual and desired slope of cut of the work implement; determining the direction of movement of the work implement required to relatively move one of a first and a second a point locations on the work implement and reduce the difference in magnitude between the actual and desired slope of cut of the work implement; and commanding an implement control system to elevationally move the work implement and change the relative elevational position of the first and second point locations.

BEST MODE FOR CARRYING OUT THE INVENTION

Figure 1:
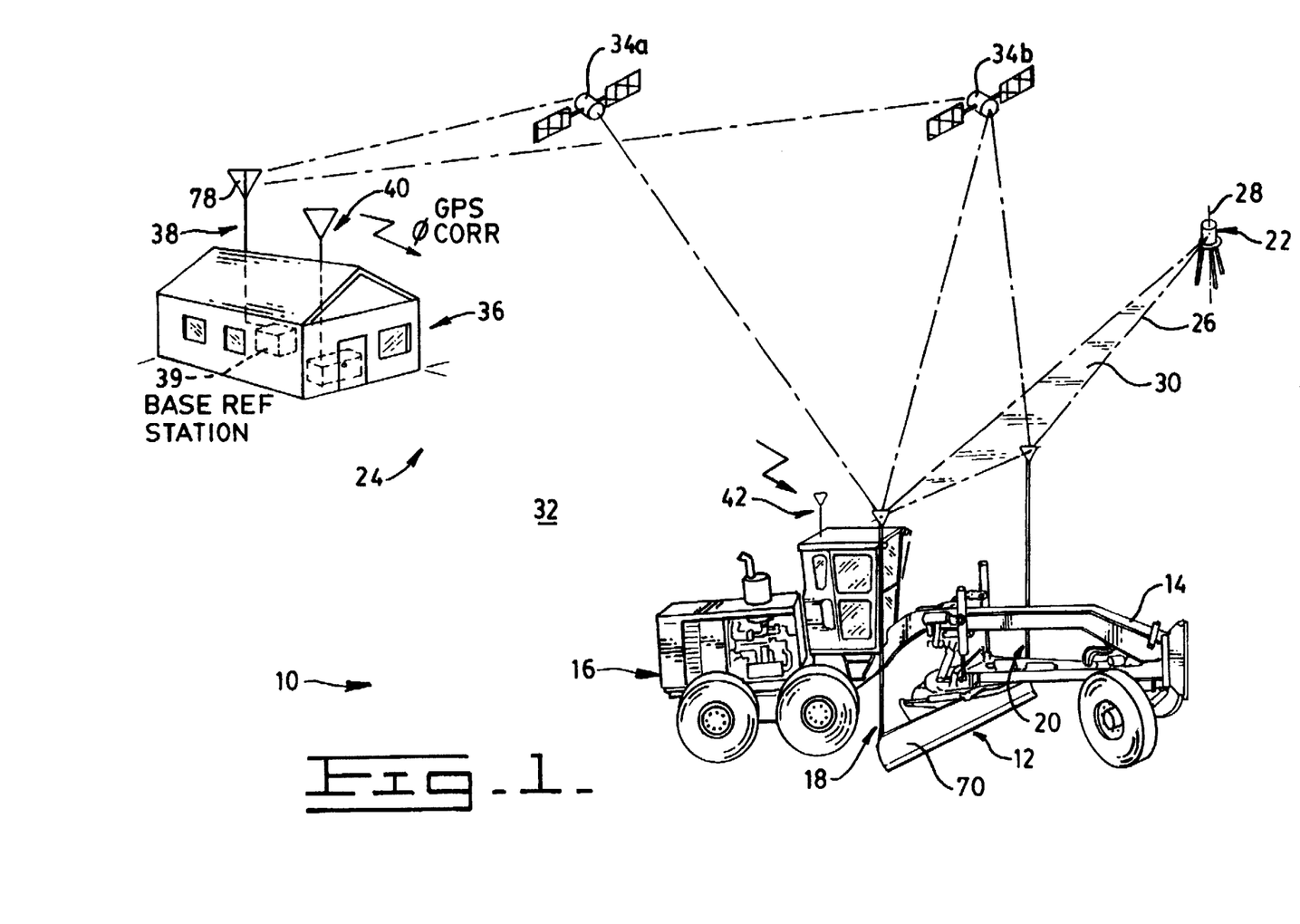
FIG. 1 is a diagrammatic isometric drawing of an embodiment of the present invention showing a combined laser and kinematic global positioning system for a geographic altering machine having a work implement.

With reference to the drawings and particularly FIG. 1, a method and system 10 for controlling the slope of cut of a work implement 12 of a geographic surface altering machine 16 is shown. The work implement 12, shown as an earth working blade, is controllably movably mounted on a frame 14 of a geographic surface altering machine 16, shown as a motorgrader. It is to be noted that other machines such as dozers, scrapers, compactors, pavers, profilers and the like, equipped with suitable surfacing altering implements, are equivalents and considered within the scope of the invention.

In the embodiment shown, the system 10 optionally includes a laser scanner 22. The laser scanner 22 is adapted to deliver a low intensity laser beam 26 swept about a substantially vertical axis 28. The laser scanner 22 is positioned at a preselected coordinate location ("x", "y") within a surveyed area hereinafter referred to as a work site 32. The swept laser beam 26 defines a plane 30 at a predetermined elevational position along the vertical axis 28 and establishes an accurate elevational coordinate position "z".

The system 10 includes a global positioning system (GPS) 24. The GPS 24 includes a constellation of satellites, two of which are shown at 34a and 34b. Preferably, four satellites in "view" of the machine 16 are selected because of favorable geometry for triangulation.

The global positioning system 24 includes a base station 36 and a reference receiving means 38 connected to the base station 36. The reference receiving means 38 is adapted to receive electromagnetic radiation delivered from a plurality of locations and responsively produce reference positioning signals. The reference receiving means 38 includes a GPS reference receiver 39. The base station 36 is located at a known, fixed position, at the work site 32. A transceiver 40 at the base station 36 and a transceiver 42 on the machine 16 provides an RF communication link between the machine 16 and the base station 36 over which reference position data is transferred. A base station processor (not shown) is used in determining the position of the base station relative to the center of the earth.

The global positioning system 24 further includes a first receiving means 18 for receiving electromagnetic radiation delivered from a plurality of remote locations and responsively producing a first position signal and a second receiving means 20 for receiving electromagnetic radiation delivered from said plurality of remote locations and responsively producing a second position signal.

Figure 2:
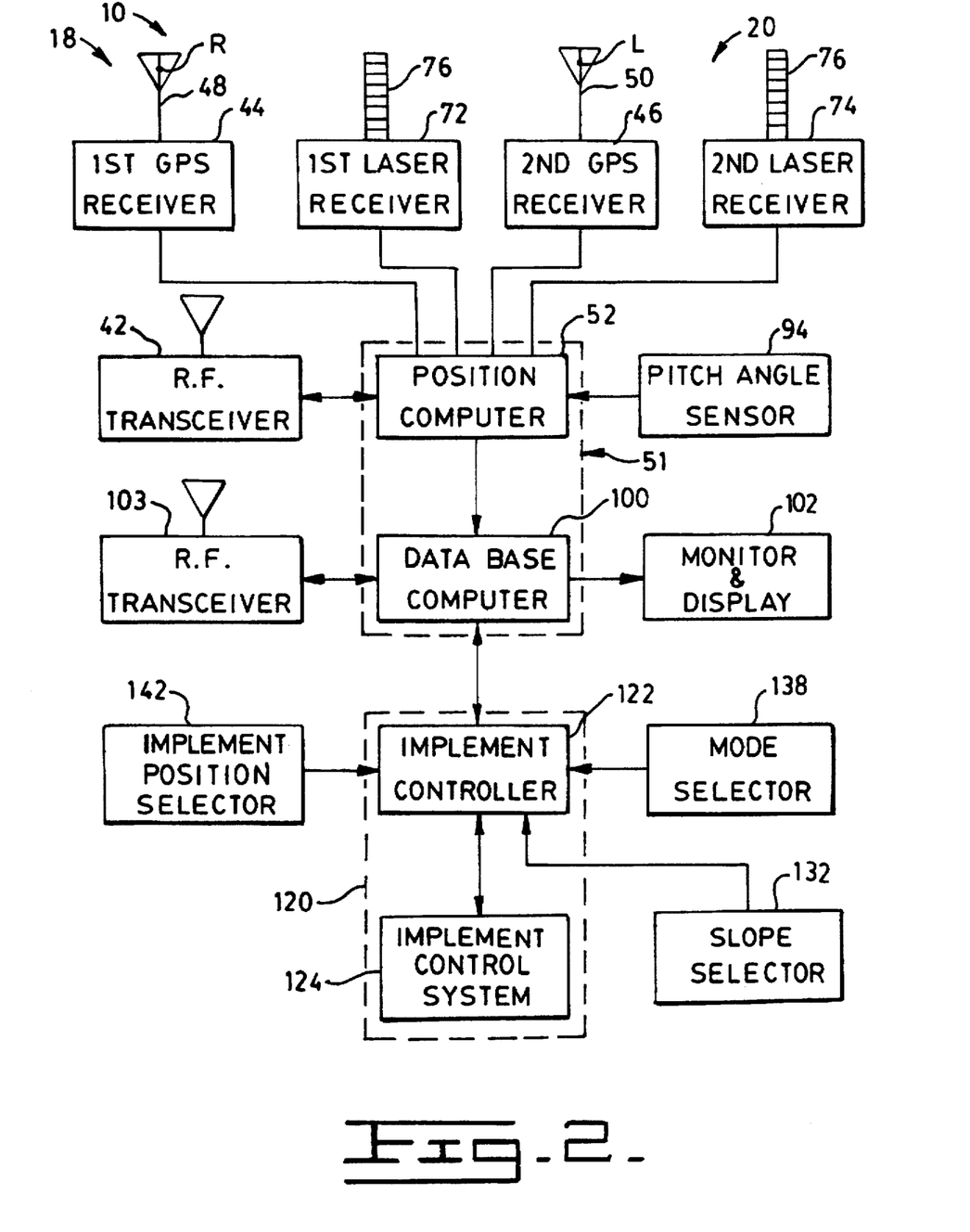
FIG. 2 is a diagrammatic block diagram of an apparatus for determining the position of a work implement and a control system for subsequently controlling the position of the work implement.

As best seen in FIGS. 1 and 2, the first receiving means 18 is connected at a first preselected location on the work implement 12 and the second receiving means 20 is connected at a second preselected location on the work implement 12. The first receiving means 18 includes a first GPS receiver 44 and the second receiving means 20 includes a second GPS receiver 46. The first and second GPS receivers each have an antenna 48,50 and a pre-amplifier (not shown). Position signals received by the first and second antennas 48,50 are amplified and delivered to the first and second receivers 44,46. The first and second receivers 44,46 decode the navigation signals and produce a pseudorange and a satellite position for each selected satellite. A processing means 51, including a position computer 52, calculates the position of the first and second receivers based on the pseudorange and satellite positions. In particular, the first and second receivers 44,46 determine the position of a receiving point location "R", "L" on the first and second antennas 48,50, respectively. The receiving points "R", "L" are the effective center of receipt of the GPS signals and are used in subsequent calculations. Global position systems such as this are known to those skilled in the art and will therefore not be discussed in any greater detail.

Figure 3:
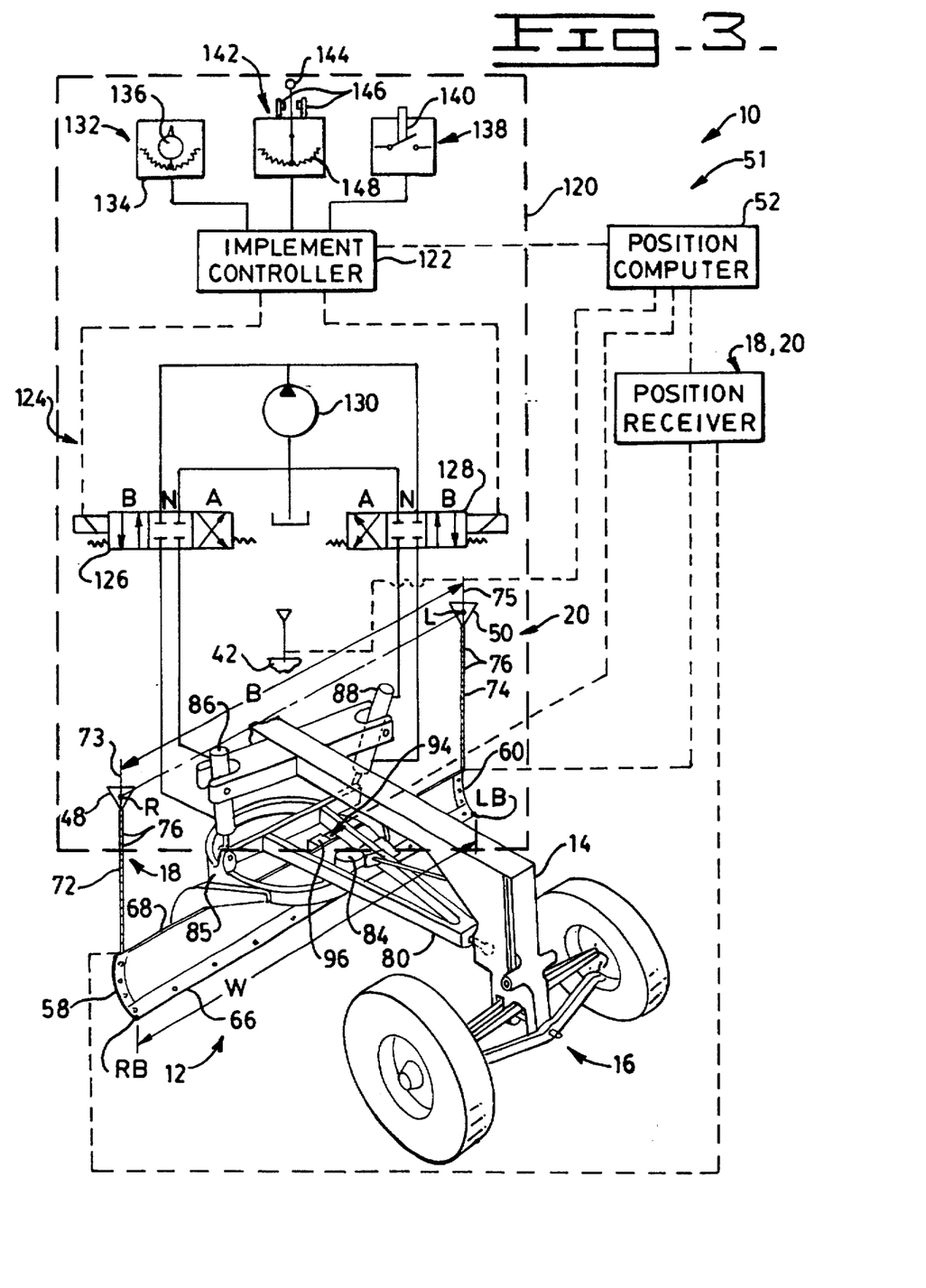
FIG. 3 is a diagrammatic schematic of the apparatus of FIG. 2 showing the control system in greater detail.

The implement 12, as shown in FIG. 3, includes an earth grading blade 70, having first and second sides 58,60, a cutting edge 66 and an upper edge 68. For reasons of simplicity, the following discussion will be with respect to this particular earth working blade. However, it is to be recognized that other implements 12 may replace the blade without departing from the spirit of the invention. The first antenna 48 is mounted on the blade 70 adjacent the first side 58 and the second antenna 50 is mounted on the blade 70 adjacent the second side 60. The receiving points "R", "L" are spaced a preselected distance "W" apart. As shown, the particular distance "W" is substantially equal in magnitude to a distance between the first and second blade sides 58,60. The first and second receiving points "R", "L" are positioned with respect to first and second point locations "RB", "LB" which preferably lie along the cutting edge 66 of the blade 70. The first and second point locations "RB", "LB" are preferably at first and second corners of the blade 70, at the intersection of the first and second sides and the cutting edge 66, and a distance "B" apart. The distance "B" is preferably equal to distance "W". Placing the first and second antennas 48,50 (receiving points "R", "L") and the first and second points "RB", "LB" at these locations simplifies three dimensional space transformation calculations between the first and second receiving points "R", "L" and the first and second point locations "RB", "LB" of the blade 70. Preferably, the first and second receiving means 18,20 are located along first and second axial lines 73,75 extending perpendicular to the cutting edge 66 and parallel to each other. It should be recognized however that other locations may be selected without departing from the spirit of the invention.

Referring to FIGS. 1 and 2, the first and second receiving means 18,20 optionally include first and second laser receivers 72,74 connected to the blade at the aforementioned first and second predetermined spaced apart locations. Preferably, the first and second laser receivers are at the location of the first and second antennas 48,50, respectively. As best seen in FIG. 3, the first and second antennas 48,50 are mounted on one end portion of the first and second laser receivers 72,74, respectively, and the other end portion of the laser receivers 72,74 are connected to the blade 70 at the upper edge 68. The laser receivers 72,74 are incremental laser receivers and include a plurality of linearly aligned photo receptors 76 and associated circuitry (not shown) for delivering an output signal representative of the particular receptor illuminated. The construction of laser receivers of this type are well known in the art and will therefore not be discussed in any greater detail. The first and second laser receivers 72,74 are provided to improve the accuracy of the implement 12 position measurement in the elevational direction and to supplement the measurement obtained from the global positioning system. The first and second laser receivers 72,74 are connected to the position computer 52. The laser receivers deliver output signals to the position computer 52 and the position computer determines the elevational coordinate position "z" of the blade 70 in three dimensional space relative to the particular work site. The first and second lines 73,75 extend along the length of the first and second laser receivers and pass through the receiving points "R" and "L".

Referring to FIG. 1, the reference receiver 39, located at the base station 36, receives signals from the constellation of GPS satellites. The base station computer (not shown) which is connected to the receiver 39 determines the position of the receiver 39 (antenna 78) with respect to the center of the Earth. The reference receiver 39 is used to make a "differential global positioning system". The first and second receivers 44,46 and the reference receiver 39 are commercially available and includes the antenna, preamplifier and receiver. The position and base station computers 52 include a commercially available microprocessor from Motorola, Inc., of Schaumburg, Ill.

Figure 4:
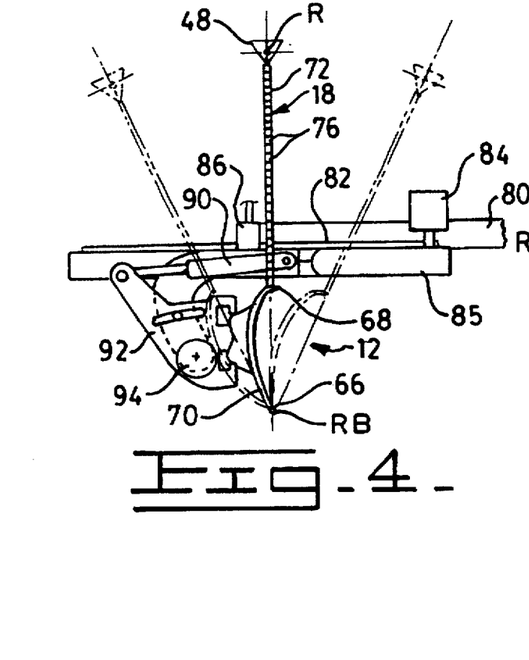
FIG. 4 is a diagrammatic side view of the work implement having first and second position receiving means mounted thereon.

Referring to FIGS. 3 and 4, the implement 12 is shown in greater detail. The blade 70 is movably connected to the frame 14 by a supporting mechanism 80. The supporting mechanism 80 includes a circle drive mechanism 82 having a selectively actuatable rotary drive motor 84 for rotating a circle 85 and the blade 70 connected thereto about an elevational axis located at the center of the circle 85 in a known manner.

As best seen in FIG. 3, the system 10 includes a control means 120, which will be subsequently discussed in greater detail, has first and second selectively actuatable fluid operated lift jacks 86,88 which are connected to and between the frame 14 and the supporting mechanism 80. The first and second lift jacks 86,88 are extensibly movable between first and second spaced apart positions and elevationally move the blade 70 relative to the frame 14. Simultaneous extension of the lift jacks 86,88 lowers the blade 70 and simultaneous retraction of lift jacks 86,88 raises the blade 70. Extension or retraction of either the first and second lift jacks 86,88, or extension of one of the first and second lift jacks 86,88 and retraction of the other of the lift jacks 88,86 results in tilting of the blade 70 relative to the frame 14 in directions transverse the direction of movement of the machine 16.

As shown in FIG. 4, a fluid operated tip jack 90 is connected to and between the supporting mechanism 80 and a bellcrank 92. The bellcrank 92 pivotally connects the blade 70 to the circle drive mechanism 82. The tip jack 90 is extensibly movable for tipping the bellcrank 92 about the pivotal connection. This results in tipping movement of the blade 70 in forward or rearward directions, as shown in phantom lines in FIG. 4, with the blade oriented transversely of the vehicle frame 14. It should be noted that the terms tip and pitch are used interchangeably and have the same meaning.

Figure 5:
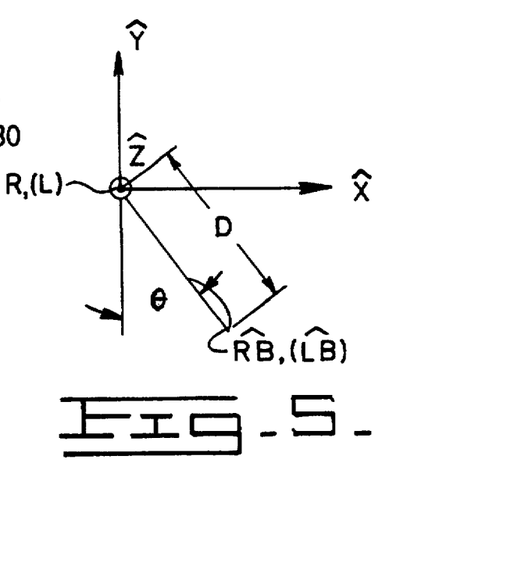
FIG. 5 is a diagrammatic view of the implement and receiving means of FIG. 4 shown pitched at an angle θ in a local coordinate system.

As best seen in FIGS. 3, 4 and 5, a sensing means 94 is provided for sensing a change in the pitch angle $\theta$ of the blade 70 and delivering a responsive pitch angle signal. The sensing means 94 includes any appropriate transducer 96 capable of sensing the tipped position of the blade about the bellcrank pivot axis. For example, a potentiometer, an encoder, a resolver, and the like. The transducer 96 is connected to the bellcrank and delivers the pitch angle signal to the position computer 52. The pitch angle signal may be either analog or digital. Should an analog signal be delivered an A/D converter is required to convert the signal for digital processing by the processing means 51. The position computer 52 determines a related current position of the first and second point locations $\hat{RB}$, $\hat{LB}$ on the work implement in a local coordinate system. The local coordinate system is a three dimensional coordinate system established relative to the frame 14 (supporting structure 80). As seen in FIG. 5, blade 70 is shown as being viewed from the second side 60 and looking down along the blade 70.

The processing means 51 receives the first and second position signals from the first and second receiving means 18,20 and determines first and second current coordinate positions "L","R", of the first and second receiving means 18,20, on a realtime basis, in a site coordinate system related to the work site 32 above. It is to be noted that the first and second signals may include the laser position signals as indicated above when additional accuracy in the elevational direction is required. Since the laser determined elevational position is more accurate than the GPS determined elevational position the processing means 51 preferably disregards the GPS elevational component and uses the laser determined elevational position "z".

Figure 6:
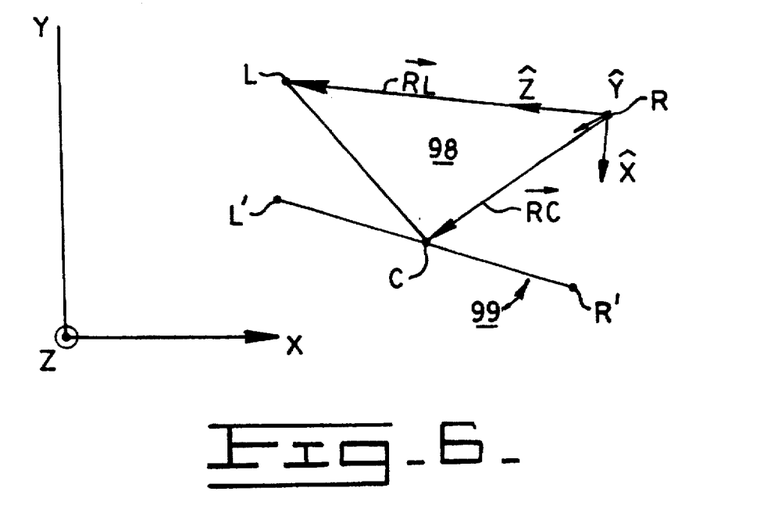
FIG. 6 shows in a site coordinate system, first and second vectors defining a plane, and unit vectors of the local coordinate system in the site coordinate system.

Referring to FIG. 6, the processing means 51, determines a plane 98 in space passing through the first and second current coordinate positions "L", "R" and a mid-point position "C", lying along a substantially straight line 99 passing between first and second previously defined coordinate positions "L'", "R'" of the first and second receiving means 18,20 in the site coordinate system. The most recent previously determined coordinate positions "L'", "R'" are stored in a memory (not shown) of the processing means 51. The effective mid-point position, "C", of the most recent blade orientation in work site coordinates $C_x$, $C_y$, $C_z$ is determined as follows $$C_x = (R'_x + L'_x)/2$$

$$C_y = (R'_y + L'_y)/2$$

$$C_z = (R'_z + L'_z)/2$$

As shown in FIG. 6, the plane 98 is defined by a first vector $\vec{RL}$ extending from the first current coordinate position "R" to the second current coordinate position "L", and a second vector $\vec{RC}$ extending from the first current coordinate position "R" and the midpoint "C" in the site coordinate system. The vectors $\vec{RL}$ and $\vec{RC}$ are determined as follows:

$$\vec{RL} = (L_x - R_x)i + (L_y - R_y)j + (L_z - R_z)k$$

$$\vec{RC} = (C_x - R_x)i + (C_y - R_y)j + (C_z - R_y)k$$

Unit vectors "i", "j", and "k" are in directions in the site coordinate system corresponding to the "x", "y", and "z" coordinate directions.

Referring to FIG. 5, knowing the current position of the first and second points $\hat{RB}$ and $\hat{LB}$ in the local coordinate system it has been determined possible to transform these point locations to the site coordinate system using the plane 98 as a reference. The position of the first and second points $\hat{RB}$ and $\hat{LB}$ in the local coordinate system relative to the frame 14 (supporting structure 80) is determined as follows:

$$\hat{RB}_x = \hat{LB}_x = D \sin\theta$$

$$\hat{RB}_y = \hat{LB}_y = -D \cos\theta$$

$$\hat{RB}_z = 0$$

$$\hat{LB}_z = W$$

where:

D=distance from the first and second receiving points R, L of the first and second receiving means 18,20 to the first and second point locations RB, LB, respectively, of the blade 70, θ=tip (pitch) angle of the blade (0=no tip, Π/2=maximum tip angle), and W=length of the cutting edge (distance between first and second sides 58,60).

The current positions of the first and second points $\hat{RB}$ and $\hat{LB}$ in the local coordinate system are determined during initialization of the apparatus, for example such as by switching the system 10 to an "on" position to activate the receiving means 18,20, the processing means 51 and the pitch angle sensor 94. Subsequent determination of the positions of the first and second points $\hat{RB}$ and $\hat{LB}$ in the local coordinate system are updated when there is a change in the tip angle θ as sensed by the sensing means 94. This is achieved by the processing means 51 comparing the current pitch angle to a previously sensed pitch angle θ' and determining the current previous sensed stored position of the first and second points $\hat{RB}$ and $\hat{LB}$, stored in the memory thereof (not shown), and updating the information to the current position of the first and second points $\hat{RB}$ and $\hat{CB}$ in the local coordinate system.

The processing means 51 calculates the definitions of the local coordinate system unit vectors $\hat{x}$, $\hat{y}$ and $\hat{z}$ in terms of the site coordinate system unit vectors for each of the first and second points as follows:

$$\hat{y} = (\vec{RL} \times \vec{RC})/|\vec{RL} \times \vec{RC}| = v12i + v22j + v32k$$

$$\hat{z} = \vec{RL}/|\vec{RL}| = v_{13}i + v_{23}j + v_{33}k$$

$$\hat{x} = \hat{y} \times \hat{z} = v_{11}i + v_{21}j + v_{31}K$$

where for vectors $\vec{a}$ and $\vec{b}$, $\vec{a} \times \vec{b}$ represents the vector cross product and $|\vec{a}|$ represents the magnitude of the $\vec{a}$ vector.

The processing means 51 converts the current first and second local point positions $\hat{RB}$, $\hat{LB}$ from the local coordinate system to the site coordinate system RB, LB, respectively, and records the position of the first and second points RB, LB in the site coordinate system. Transformation of the first and second local point positions to the site coordinate system is determined in the following manner:

$$RB = V\hat{RB}$$

$$LB = V\hat{LB}$$

where V is the following matrix:

$$V = \begin{pmatrix} v11 & v12 & v13 & R_x \\ v_{21} & v22 & v23 & R_Y \\ v31 & v31 & v33 & R_Z \\ 0 & 0 & 0 & 1 \end{pmatrix}$$

where:

$$\hat{RB} = [\hat{RB}_x, \hat{RB}_y, \hat{RB}_z, 1]^T$$

$$RB = [RB_x, RB_y, RB_z, 1]^T$$

and similarly:

$$\hat{LB} = [\hat{LB}_x, \hat{LB}_y, \hat{LB}_z, 1]^T$$

$$LB = [LB_x, LB_y, LB_z, 1]^T$$

The vectors at RB and LB contain the coordinates of the first and second point locations RB and LB on the blade 70.

Given this information it is now possible to determine the % slope of cut of the work implement 12.

Figure 7:
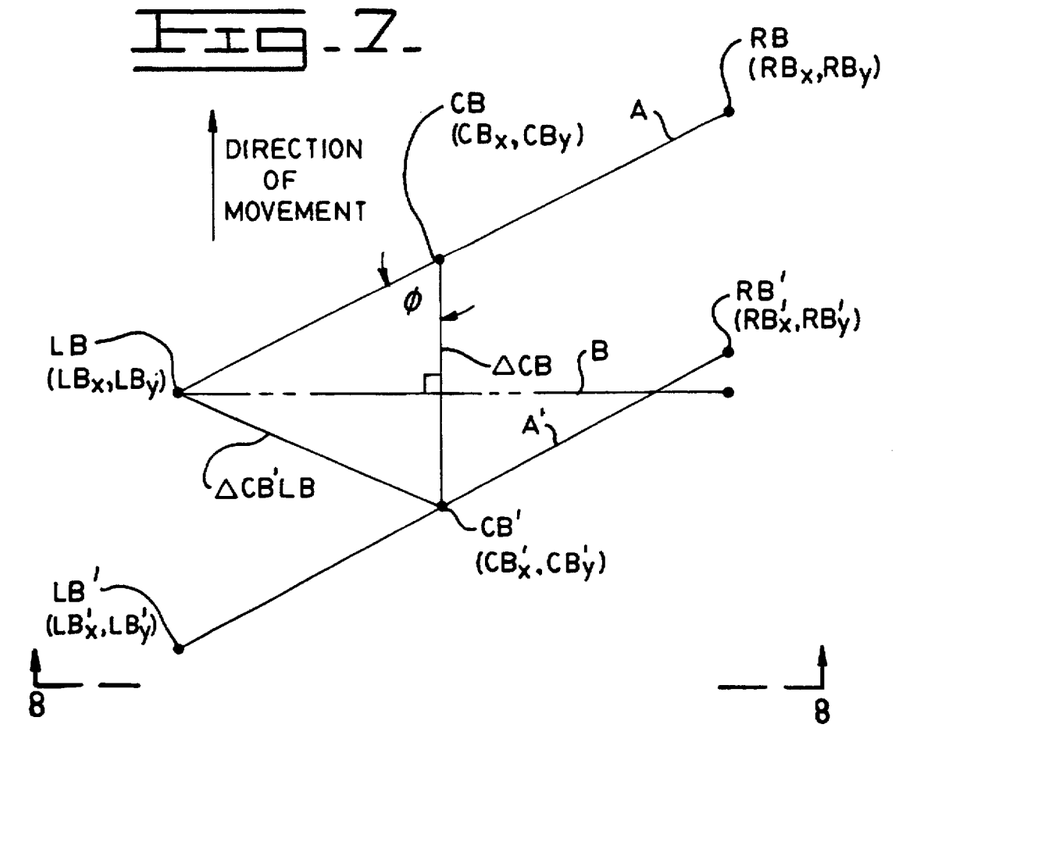
FIG. 7 is a diagrammatic plan view showing the geometry of a projection of a straight line in a horizontal plane extending between RB, LB at the previous and current positions of the work implement.
Figure 8:
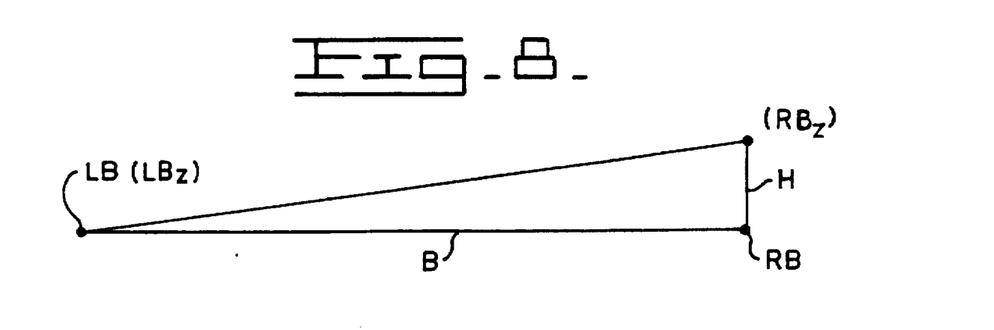
FIG. 8 is a diagrammatic end view taken along lines 8—8 of FIG. 7.

Referring to FIGS. 7 and 8, the geometry associated with the method and system 10 for determining the actual cross slope of cut of a work implement 12 is illustrated in some detail. FIG. 7. shows a plan view of a projection of the first and second current point locations RB, LB connected by a straight line "A", first and second previous point locations RB'.LB' connected by a straight line A', previous and current midpoints CB, CB' connected by a straight line ΔCB, a straight line projection "B" extending from LB normal to ΔCB, and the relative direction of movement of the work implement 12. FIG. 8 is an end view taken along lines 8—8 of FIG. 7 illustrating the slope of cut H/B of the work implement 12 based on an elevational coordinate component $RB_z$ and a projection of the straight line "B". In the particular illustration shown straight lines "A" and "A'" are at the edge 66 of the work implement.

Given the coordinates of the first and second point locations RB and LB on the work implement in the site coordinate system, the processing means 51, and particularly the position computer 52, determines the actual cross slope of cut of the work implement 12 (% slope) based on the first and second point positions RB, LB and the previous first and second point positions RB', LB'.

Using the coordinate positions of the first and second current point positions RB,LB, as determined above, the effective current coordinate midpoint position CB along the current straight line "A" passing between the first and second current point locations LB, RB on the work implement 12 is determined as follows:

$$CB_x = (RB_x + LB_x)/2$$

$$CB_y = (RB_y + LB_y)/2$$

The change ΔCB in the effective current midpoint position CB from a previous mid point position CB' lying along a previous straight line "A'" passing between the first and second previous point locations LB', RB' on the work implement 12 is then determined as follows:

$$\Delta CB_x = CB_x - CB_x'$$
$$\Delta CB_y = CB_y - CB_y'$$
$$\Delta CB = \sqrt{(\Delta CB'LB_x)^2 + (\Delta CB'LB_y)^2}$$

The distance CB'LB between the current second point location LB and the previous effective midpoint position CB' is then determined as follows:

$$\Delta CB'LB_x = LB_x - CB_x'$$
$$\Delta CB'LB_y = CB_y - CB_y'$$
$$\Delta CB'LB = \sqrt{(\Delta CB'LB_x)^2 + (\Delta CB'LB_y)^2}$$

As best seen in FIG. 7, "A" represents the length of a straight line drawn between a projection of the first and second current point locations RB, LB of the work implement 12 onto a horizontal plane, and "A'" represents the length of a straight line drawn between a projection of the first and second previous point locations RB', LB' of the work implement 12 onto a horizontal plane. It should be recognized that in the preferred embodiment the "A" is the length of the cutting edge between the first and second points locations RB, LB. Knowing the coordinates $RB_x$, $RB_y$ and $LB_x$, $LB_y$ of the first and second current point locations RB, LB, respectively, the length of the projection of the current straight line "A" onto the horizontal plane is calculated in accordance with the following equation:

$$A = \sqrt{(RB_x - LB_x)^2 + (RB_y - LB_y)^2}$$

Using the Law of Cosines, the angle φ between the projection of the current straight line "A" in the horizontal plane and a straight line ΔCB connecting the midpoints of the current and previous straight lines CB', CB, is determined. Line ΔCB is in the direction of travel of the work implement 12. The effective center position change, is determined by the following equation:

$$\phi = \arccos(0.5A/2\Delta CB + 2\Delta CB/A - 2\Delta CB'LB/A\Delta CB'LB).$$

An effective length "B" of a projection of the current straight line projection "A" oriented normal to the straight line ΔCB connecting the midpoints CB', CB is determined by the following equation:

$$B = A \sin(\phi)$$

Referring to FIG. 8, the elevational difference "H" between the first and second point locations RB, LB is determined by equation, $H = R_z - LB_z$. The actual true percent slope of cross cut of the work implement 12 with respect to the second point location LB is determined by equation, % slope=100H/B. The processing means 51 delivers a slope signal representative of the determined % slope to the control means 120.

Referring to FIG. 2, the processing means 51 includes a database computer 100, of any suitable type, for example an IBM personal computer having an Intel 486 microprocessor, and adequate memory. The database computer is connected to the position computer 52. The database computer 100 receives signals from the position computer 52 and updates in real time the current coordinate position of the first and second point locations RB, LB on the blade 70 within the work site and the % slope of the work implement as the machine 16 traverses the work site. The database computer 100 is also connected to a transceiver 103. The transceiver 103 is mounted on the machine 16 and in radio frequency transmission communication with the transceiver 40 at the base station 36. The transceiver 40 is connected to a landbase computer (not shown) located at the base station 36. The transceiver 40 communicates with the transceiver 103 and transfers data between the database computer 100 and the landbase computer. Data such as machine position, implement position, changes to the earth's topography, the % slope of the work implement 12, and like are transmitted therebetween. For example, the % slope of the work implement 12, and changes thereof caused by the dynamics of operation of the machine 16 as the machine traverses the underlying terrain, is updated in real time in the position computer 52 located on the machine 16, based on the tracking of the first and second points RB, LB in the site coordinate system. Information such as this is transmitted to update the landbase computer.

A monitor 102 of any suitable commercially available construction for example, a liquid crystal display, a cathode ray tube, or other suitable device capable of displaying information, is connected to the database computer 100. The database computer 100 delivers signals to the monitor 102 which displays pictorially or graphically the current position of the blade relative to the work site. The display also shows, in either two or three dimensions, or numerically the actual and desired cross slope of cut of the work implement 12.

Digitized plans or models of the actual work site, as previously determined by a topographic survey, may be loaded into the database computer 100. A digitized plan or model of the desired work site, as drafted by an architect, may also be loaded into the database computer 100. The actual work site data is updated in real time based on the position of the first and second point locations RB, LB, as determined above. The database being dynamic facilitates realtime tracking of the first and second point locations RB, LB and the area of the earth's surface being altered by the blade 70 as the blade traverses the work site. A responsive signal is delivered from the database computer 100 to the monitor 102 and the current position of the blade 70, the actual work site, as altered, the actual and desired % slope, and the desired work site elevation is displayed singularly or in combination on the monitor 102, as requested by the machine operator.

As best seen in FIGS. 2, 3 and 9, the control means 120 includes an implement controller 122 and an implement control system 124. The implement controller 122 includes a processor (not shown) of any suitable design. Preferably, the processor is a micro processor having appropriate software. However, a processor consisting of discretely arranged electronic components is considered suitable and within the spirit of the invention. The implement controller 122 is connected to processing means 51 and receives implement slope position commands therefrom. The implement controller 122 is also connected to the implement control system 124 and delivers valve positioning control signals to the implement control system 124. Preferably, the implement controller 122 includes a digital to analog converter and a driver circuit of conventional design. The driver circuit is connected to and delivers valve positioning control signals to the implement control system 124.

As best seen in FIG. 3, the implement control system 124 includes first and second three way infinitely variable electrohydraulic control valves 126,128 each connected to the implement controller 122 and adapted to receive the aforementioned valve positioning control signals. The first electrohydraulic control valve 126 is connected to and between a source of pressurized fluid flow 130 and the first lift jack 86 and the second electrohydraulic control valve 128 is connected to and between the source of pressurized fluid flow 130 and the second lift jack 88. The first and second electrohydraulic control valves are each shiftable from a neutral position "N" at which fluid flow at the first and second jacks 86,88, respectively, is blocked and to either of a first position "A" and a second position "B". Fluid flow from the source 130 is delivered to the first jack 86 in response to the first electrohydraulic control valve 126 being at either of the first and second positions "A", "B". Similarly, fluid flow from the source 130 is delivered to the second jack 88 in response to the second electrohydraulic control valve 128 being at either of the first and second positions "A", "B". The first and second electrohydraulic control valves 126,128 cause the respectively connected first and second jacks 86,88 to extend toward the first position in response to being at the first position "A" and to retract toward the second position in response to being at the second position "B".

As best seen in FIGS. 2 and 3, a slope means 132 is provided for selecting a desired cross slope of cut of the work implement 12 and delivering a desired slope signal to the implement controller 122. The slope means 132 preferably includes a slope selector 134 having a dial 136 which rotates to a plurality of positions. The slope selector 134 changes the desired slope signal delivered at each of the plurality of positions. The slope selector 134 is shown as having a potentiometer. However, any slope selector 134 capable of delivering either an analog or digital signal, depending on the components selected, is within the spirit of the invention.

A mode means 138 is provided for manually selecting one of an "automatic" or "manual" mode of operation of the control means 120 and delivering a responsive mode signal. The mode means 138 preferably includes a two position switch 140 of any suitable conventional design which is movable between spaced apart an open and closed position. The switch 140 is connected to the control means 120 and delivers an "automatic" mode signal at one of the open and closed switch positions and delivers a "manual" mode signal at the other of the open and closed switch positions. Specifically, the mode means 138 is connected to and delivers the mode signal to the implement controller 122. The control means 120 enables automatic slope control of the work implement 12 in response to receiving the "automatic" mode signal and disables automatic slope control of the work implement 12 in response to receiving the "manual" mode signal.

An implement position selector means 142 is manually actuatable for selecting the speed and elevational direction of movement of the work implement 12 and delivering a responsive implement control signal. The implement position selector means 142 is connected to the control means 120. Preferably, the implement position selector means 142 includes a joy stick 144, a plurality of switches 146 (two shown), and a potentiometer 148. The joy stick 144 is manually pivotally movable to a plurality of positions for selecting the speed and direction of elevational movement of the work implement 12. Actuation of selected ones of the plurality of switches, by movement of the joy stick, controls the direction of movement of the first and second lift jacks. The speed of movement of the first and second jacks 86,88 is determined by the potentiometer and the pivoted position of the joy stick. It should be recognized that the specific construction of the implement position selector means 142 may be replaced by other embodiments, for example, a digital equivalent using an encoder or the like without departing from the invention. The implement control signal is delivered to the implement controller 122 which responds and delivers a corresponding signal to one or both of the first and second electrohydraulic control valves 126,128.

The control means 120 receives the signals from the slope means 132, the implement position selector means 142 and the mode means 138 and makes decisions based on these signals. The implement controller 122 automatically maintains the slope of the work implement 12 at a preselected desired slope as selected by the slope means 132 and prevents automatic slope control of the work implement 12 from occurring when the mode means 138 is in the "manual" mode. In the automatic mode of operation the implement controller 122 delivers control signals to the implement control system 124 to maintain the work implement 12 at the desired slope in response to a difference between the desired and actual slope of the work implement 12. It is to be noted that a predetermined tolerance between the actual and desired % slope is provided, based on the particular machine to which the implement is mounted. It is to be noted that the actual % slope signal and the desired % slope signals may be compared in software and an appropriate slope control signal is delivered to correct any deviation between the actual and desired % slope.

The desired % slope and the actual % slope signals are processed in the implement controller 122 and a representative signal is delivered to the implement control system 124 in response to a difference between the actual and desired % slope signals. The implement control system 124 responds to this representative signal and based on the magnitude and sense of the signal elevationally moves the work implement 12 to change the relative elevational positions of the first and second point locations RB, LB on the work implement 12. The work implement 12 moves in an elevational direction based on the representative signal sense and at a speed based on the signal magnitude. The implement controller 122 delivers a control signal to a selected one of the first and second electrohydraulic control valves 126,128 and the selected electrohydraulic control valve moves one of the first and second point locations RB, LB elevationally relative to the other in response to receiving the control signal. In the embodiment shown, an automatic change in the slope of cut of the work implement 12 is obtained by actuating only the first electrohydraulic control valve 126 to direct fluid flow to the first jack 86 and elevationally move the first point location RB relative to the second point location LB. However, it is to recognized that automatic control of the second electrohydraulic control valve 128 may be provided in a similar manner without departing from the spirit of the invention.

The implement controller 122 stops delivery of the control signal to the selected one of the first and second electrohydraulic control valves 126,128 in response to the desired and actual cross slope of cut of the work implement being substantially equal in magnitude. The electrohydraulic control valves 126,128 in the absence of receiving the control signal move to the neutral position "N", under the bias of centering springs or the like, and prevents fluid flow from the source of pressurized fluid flow 130 from telescopically moving the associated lift jack 86,88.

Industrial Applicability

With reference to the drawings and in operation, the operator of the geographic surface altering machine 16 selects the "automatic" mode of operation of the work implement 12 by placing the switch 140 of the mode means 138 at an appropriate one of the open and closed positions. The operator also selects the desired % slope of cut of the work implement by positioning the dial of the slope means 132 at an appropriate position.

The processing means 51, in response to receiving position signals from the first and second receiving means 18,20, determines the coordinate position of the work implement 12 in three dimensional space in the work site 32, determines the actual % slope of cut of the work implement 12, as indicated by the above equations, and delivers an actual % slope signal to the implement controller. The implement controller 122 determines a difference between the actual and desired slope of cut of the work implement, and the direction of movement of the work implement required to relatively move one of the first and second point locations RB, LB on the work implement 12 to reduce the difference in magnitude between the actual and desired slope of cut of the work implement 12. The implement controller 122 commands the implement control system 124 to elevationally move the work implement 12 and change the relative elevational position of the first and second point locations RB, LB in response to a difference between the actual and desired % slope of cut of the work implement.

The implement control system 124 responds to the slope signal and actuates a selected one of the first and second control valves 126,128 to telescopically move the associated one of the first and second jacks 86,88 and move the work implement 12 in an appropriate direction to reduce the difference in the actual and desired % slope of cut. As indicated above, the location of the first and second points RB,LB, both previous and current, enables determination of the % slope of cut of the work implement 12. Since the system 10 is capable of making corrections in real time as the machine 16 traverses the underlying terrain, the % slope of the work implement 12 may be accurately maintained.

The implement controller 122 stops delivery of the slope signal in response to the actual and desired % slope of cut being substantially equal in magnitude. The implement control system 124 responds and stops movement of the actuated one of the first and second lift jacks 86, 88 by enabling movement of the appropriate one of the actuated first and second electrohydraulic control valves to the neutral position "N".

The implement controller 122 also delivers the desired actual % slope signals selected by the slope means 132 to the database computer 100. The database computer 100 and delivers a responsive signal to the monitor 102 which indicates the desired % slope of the work implement 12. The actual % slope signal determined by the position computer 52 is also delivered to the database computer 100. The database computer 100 and delivers a responsive signal to the monitor 102 and the monitor 102 indicates the actual % slope of the work implement. Preferably, a graphical or pictorial representation of the relative actual and desired slope of cut position of the work implement is shown.

Should the operator elect to abandon automatic slope control and manually control the slope of the work implement the operator simply moves the mode means 138 to the other position at which the "manual" mode signal is delivered to the implement controller 122. At this position automatic operation of the implement control system 124 is disabled and manual control, by way of the implement position selector means 142, is enabled.

Other aspects, objects and advantages of the present invention can be obtained from a study of the drawings, the disclosure and the appended claims.

I claim:

1. A system for controlling the position of a work implement movably connected to a work machine and maintaining the work implement at a preselected slope of cut relative to a geographic surface, comprising:

first receiving means for receiving electromagnetic radiation delivered from a plurality of remote locations and responsively producing a first position signal, said first receiving means being connected to said work implement and being at a first preselected location relative to a first point location on the work implement;

second receiving means for receiving electromagnetic radiation delivered from said plurality of remote locations and responsively producing a second position signal, said second receiving means being connected to said work implement and being at a second preselected location relative to a second point location on the work implement, said second location being spaced a preselected distance from said first location;

slope means for selecting a desired cross slope of cut of the implement and delivering a responsive desired slope signal;

processing means for receiving said first and second position signals, determining the first and second point positions of the implement in a site coordinate system, determining the actual cross slope of cut of the work implement based on the first and second point positions and previous first and second point position and delivering a responsive actual slope signal;

control means for receiving said desired and actual slope signals and elevationally moving the work implement to change the relative elevational positions of the first and second point locations on the implement in response to a difference between the desired and actual cross slope of cut of the work implement, said implement moving in an elevational direction based on the difference between the desired and actual cross slope of cut of the work implement, said control means being connected to said processing means.

2. A system, as set forth in claim 1, wherein said control means stopping elevational movement of the work implement in response to the desired and actual cross slope of cut of the work implement being substantially equal in magnitude.

3. A system, as set forth in claim 1, including mode means for manually selecting one of an "automatic" and "manual" mode of operation and delivering a responsive mode signal, said control means receiving said mode signal and enabling automatic slope control of the work implement in response to the mode signal being "automatic".

4. A system, as set forth in claim 3 wherein said slope means includes a slope selector having a dial and being rotatable to a plurality of positions, said selector delivering a different slope signal at each of the positions of the slope selector.

5. A system, as set forth in claim 3, wherein said control means receiving said mode signal and disabling automatic slope control of the implement in response to the mode signal being "manual", and including an implement position selector means for manually selecting the speed and elevational direction of movement of the work implement and delivering a responsive implement control signal, said control means receiving said implement control signal and responsively elevationally moving said implement.

6. A system, as set forth in claim 5, wherein said implement position selector means includes a joy stick selectively manually movable to a plurality of positions at which the speed and direction of elevational movement of the implement is selected.

7. A system, as set forth in claim 5, wherein said control means includes:

an implement control system having first and second electrohydraulic control valves each movable between first and second fluid passing positions and first and second spaced apart jacks connected between said implement and frame, said first and second jacks being telescopically movable between first and second spaced positions and said work implement being elevationally movable in response to movement of said first and second jacks between said first and second positions, said first and second jacks being respectively connected to said first and second control valves, said first jack being telescopically movable toward said first position in response to said first valve being at the first position and telescopically movable toward said second position in response to said first valve being at said second position, said second jack being telescopically movable toward the first position in response to said second valve being at the first position and telescopically movable toward the second position in response to said second valve being at said second position;

an implement controller connected to said processing means and implement control system, said implement controller determining the required direction of movement of the implement based on the difference in the actual and desired cross slope of cut, and delivering a control signal to a selected one of the first and second electrohydraulic control valves, said selected control valve moving to one of the first and second positions in response to receiving said control signal.

8. A system, as set forth in claim 7, wherein said first and second electrohydraulic control valves each have a neutral position at which fluid flow is blocked, said implement controller stopping the delivery of the control signal to said selected one electrohydraulic control valve in response to the desired and actual cross slope of cut of the work implement being substantially equal in magnitude.

9. A system, as set forth in claim 1, including a database computer means for recording in real time the desired and actual cross slope of cut of the work implement in response to receiving actual and desired slope signals, said database computer means being connected to said control means and said processing means.

10. A system, as set forth in claim 9, including a monitor connected to said database computer means, said database computer means delivering a signal to said monitor and said monitor and graphically displaying the actual and desired cross slope of cut of the work implement.

11. A system, as set forth in claim 1, wherein said first and second receiving means each include a global position receiver.

12. A system, as set forth in claim 11, wherein the first and second receiving means each include a laser receiver.

13. A system, as set forth in claim 1, said processing means determining a current mid-point position along a current straight line passing between the first and second point locations on the work implement, determining a change in the midpoint position between the current and a previous midpoint position along a previous straight line passing between the first and second point locations on the work implement, determining a distance between a current second point location and the previous midpoint position, determine a length of a projection of the current straight line onto a horizontal plane, determine the angle $\phi$ between the projection of the current straight line in the horizontal plane and a straight line connecting the midpoints of the current and previous straight lines, determining the length of a projection of the current straight line oriented normal to the straight line connecting the midpoints, determining the elevational difference between the first and second point locations, and determining the actual slope of the cross cut with respect to the second point location.

14. A method for automatically controlling the slope of cut of a work implement, comprising the steps of:

determining a current mid-point position alone a current straight line passing between a first and second point locations on the work implement;

determining a change in the midpoint position between the current and a previous midpoint position along a previous straight line passing between the first and second point locations on the work implement;

determining a distance between a current second point location and the previous mid-point position;

determining a length of a projection of the current straight line onto a horizontal plane;

determining an angle $\phi$ between the projection of the current straight line in the horizontal plane and a straight line connecting the midpoints of the current and previous straight lines;

determining the length of a projection of the current straight line oriented normal to the straight line connecting the midpoints;

determining an elevational difference between the first and second point locations;

determining the actual slope of the cross cut with respect to the second point location;

determining a difference between the actual and desired slope of cut of the work implement;

determining the direction of movement of the work implement required to relatively move one of the first and the second point locations on the work implement and reduce the difference in magnitude between the actual and desired slope of cut of the work implement;

commanding an implement control system to elevationally move the work implement and change the relative elevational position of the first and second point locations; and stopping relative elevational movement of the work implement in response to the actual and desired slope having substantially the same magnitude.

15. A method for automatically controlling the slope of cut of a work implement, comprising the steps of:

receiving electromagnetic radiation delivered from a plurality of remote locations and responsively producing a first and second position signal, said first and second position signal corresponding to a first and second point location on the work implement;

determining the first and second point positions of the implement in a site coordinate system;

determining the actual cross slope of cut of the work implement in response to the first and second point positions and a previous first and second point positions;

determining a difference between the actual and desired slope of cut of the work implement;

determining the direction of movement of the work implement required to relatively move one of a first and a second point locations on the work implement and reduce the difference in magnitude between the actual and desired slope of cut of the work implement; and commanding an implement control system to elevationally move the work implement and change the relative elevational position of the first and second point locations.

* * * * *